Inventor
CARL WILLIAM SCOTT
By Arnold and Mathis
Attorneys

May 13, 1952 C. W. SCOTT 2,596,824
FILLING AND WEIGHING DEVICE FOR BINS
Filed Dec. 20, 1948 6 Sheets-Sheet 4

Fig. 4.

Inventor
CARL WILLIAM SCOTT
By
Arnold and Mathis
Attorneys

Patented May 13, 1952

2,596,824

UNITED STATES PATENT OFFICE 2,596,824

FILLING AND WEIGHING DEVICE FOR BINS

Carl William Scott, Kirkland, Wash.

Application December 20, 1948, Serial No. 66,159

7 Claims. (Cl. 249—60)

My invention relates to a bin filling and weighing device, and which device is particularly applicable to the filling and weighing of containers with granular or powdered materials or a combination of the same.

As an example of my invention, and not as a limitation thereof, my invention will be described in connection with the filling and weighing of bins of the nature of those described in the co-pending joint application of the present inventor and a Frank J. White, Serial No. 54,114, entitled "Shipping Container and Shipping Construction," and filed October 12, 1948.

Granular material, such as flour, sugar, salt, grain, beans, and the like, has little head and tends to have an angle of repose, if allowed to fall or drop into a container, of substantially 45 degrees. Also flour-like material, when merely delivered into a bin, tends to include therein substantial quantities of air so that the full space of a container is not utilized.

It is an object of my invention to fill a bin with granular material, such as through an opening at the top thereof, in a vertical direction to the bin and to change the direction of flow of the material within the bin to substantially a horizontal direction. Such diversion or change of direction of the granular material tends to provide a product level which is substantially horizontal and tends to change said normal angle of repose of substantially 45 degrees to a horizontal plane, and tends to minimize any vertical component in the impact of the granular material with the result of reducing the number of fines under the standard granular size of the material involved.

More particularly, my invention includes therein an impeller device which is movable into and out of a bin or container to be filled, which impeller changes the direction of flow of the incoming granular material from substantially a vertical direction to substantially a horizontal direction.

It is a further object of my invention to provide such an impeller operating at an increased material discharge speed over the incoming material speed and to utilize such impeller in regulating the amount of material to be delivered into the bin or container.

It is a further object of my invention to dispose a feed impeller between a material inlet and an air exhaust so that the impeller functions not only as an adjunct in the material feeding means but as an adjunct in the means for exhausting air from the material.

It is a further object of my invention to provide in combination a jolting or packing mechanism, wherein the bin being filled and the granular material being delivered therein are periodically raised free of and then dropped on a fixed support, so that the granular material is jarred or jolted and packed, and air is released from the interstices between the pieces of granular material.

It is a further object of my invention to provide a cycle of operation for a granular material filling and weighing device for bins wherein, after starting, the cycle automatically continues with the following operations: First the filling unit is lowered into the bin. Then an inspection period is provided for the operator to determine that all parts are in the desired operative positions. Next, the filling mechanism is manually started; and then the devices for filling the bin and jolting or jarring the same, so as to pack the granular material and remove the air, is started and the cycle continues automatically thereafter. The filling and jolting devices continue to operate until a predetermined weight, e. g., 2950 pounds is reached; and then the filling device is operated at spaced intervals to provide a dribble or relatively small in-flow of material and at the same time the jolting or packing of the material is continued. When a second predetermined weight, e. g., 3000 pounds, is reached, then the filling mechanism is shut off; thereafter there is one final jolt and then the filling device is removed from the bin, thus completing a cycle.

It is a further object of my invention to provide an impeller for changing the direction of the incoming material and which impeller has a bottom surface of a character which will remove product from below the impeller and thus spreads or levels the top surface of the pile of product and prevents rubbing of the product by the impeller and prevents a resultant possible burning of the product.

It is a further object of my invention to electrically interconnect the weighing and filling mechanism so that upon completion of weighing, the filling mechanism is not only made inoperative, but is removed from the bin.

It is a further object of my invention to provide a filling mechanism of a character so that the same will provide a constant weight on the bin even though the bin is being periodically lifted and allowed to drop on a fixed support. More particularly, it is an object of my invention to suspendingly support the filler mechanism above a vertically moving bin and to provide a predetermined weight on the bin with a flexible bellows providing a product tight connection between the bin and the filling mechanism.

It is a further object of my invention to provide a movable weighing mechanism which will be responsive to the weight of objects thereon as the bin is moved upwardly but which weighing mechanism will not be affected (e. g., jarred or vibrated) as the bin is permitted to fall against a fixed support.

It is a further object of my invention to provide a weighing mechanism for use in combination with a bin which is being filled and jolted, and which weighing mechanism includes therein hydraulic means having trapped liquid under pressure interconnecting the load to be weighed and the weight responsive means.

It is a further object of my invention to provide such a hydraulic means in such combination wherein the trapped liquid under pressure passes through a flexible connecting means, as a spiral tube.

It is a further object of my invention to provide a fixed support and a movable support in a jolting mechanism wherein said supports telescopically and slidably interfit.

The above mentioned general objects of my invention, together with others inherent in the same are attained by the devices illustrated in the accompanying drawings throughout which like reference numerals indicate like parts.

Figure 1:
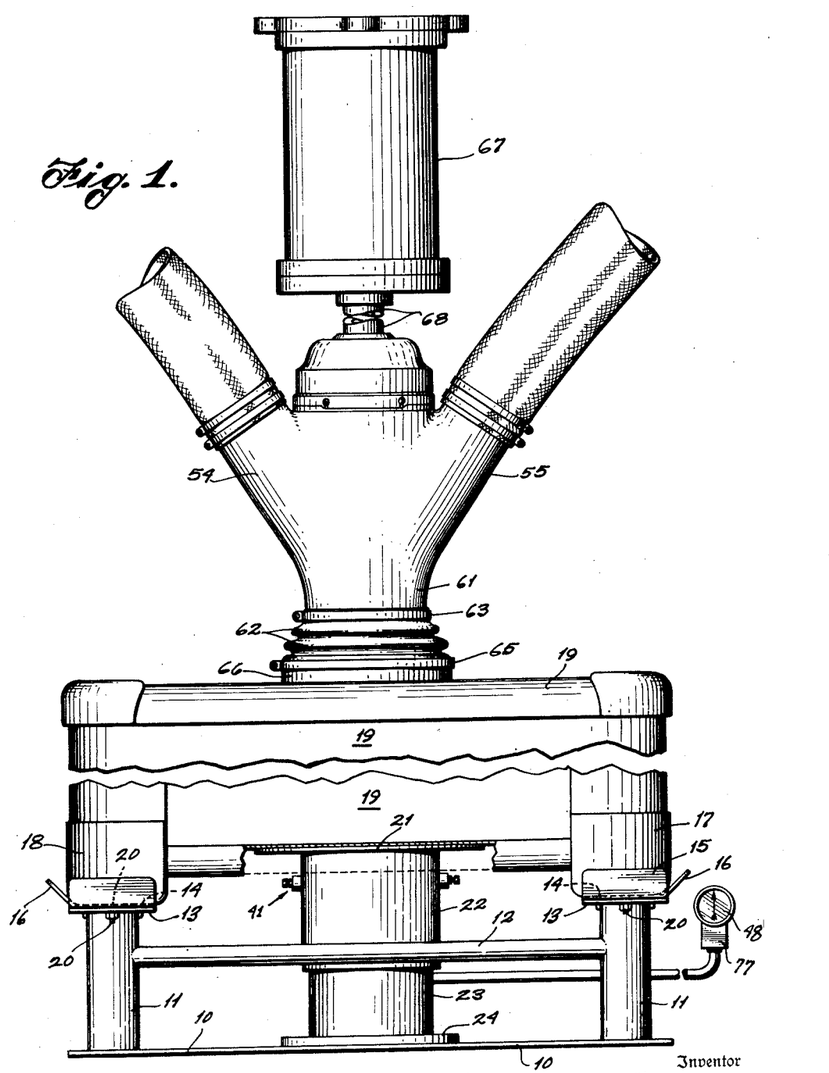
Figure 1 is a view in side elevation, with parts broken away, of devices embodying my invention.
Figure 2:
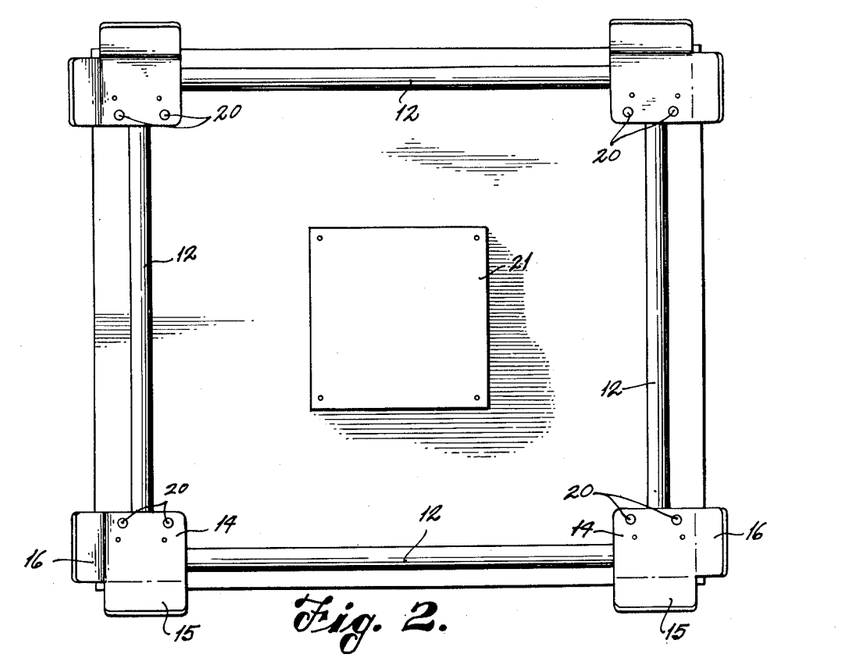
Fig. 2 is a plan view with the bin and filler device shown in Fig. 1 removed.

Referring now to Figs. 1 and 2 of the drawings, any suitable base 10 supporting four legs 11 is provided. The legs 11 are also supported by cross braces 12. The base 10, legs 11, and cross braces 12, are preferably metallic and may be secured together as by welding. Each of the legs 11 is secured to a plate 13, as by welding, and the plate 13 preferably support centering devices comprising flat plates 14 having angular portions 15 and 16, which angular portions function as centering devices for the legs 17 and 18 of the bin 19.

In the event that the bin 19 is not a true square in horizontal section, it is preferable that the plates 14 and the portions 15 and 16 secured thereto be removable from the plate 13 so that the bin 19 can rest on the plates 14 and the portions 15 and 16 will have their centering function when the bin is in one position or is angularly moved about a vertical axis to a position which is 90° from its position before said angular movement. Thus a plurality of nut and bolt means 20 are provided for removably securing the plates 14 to the plates 13. In the drawings, each of the outer nut and bolt means 20 is being utilized and the inner of each set is not. If the inner of each set is utilized, then the plates 14 may be utilized to center a bin moved one quarter of a turn.

Figure 3:
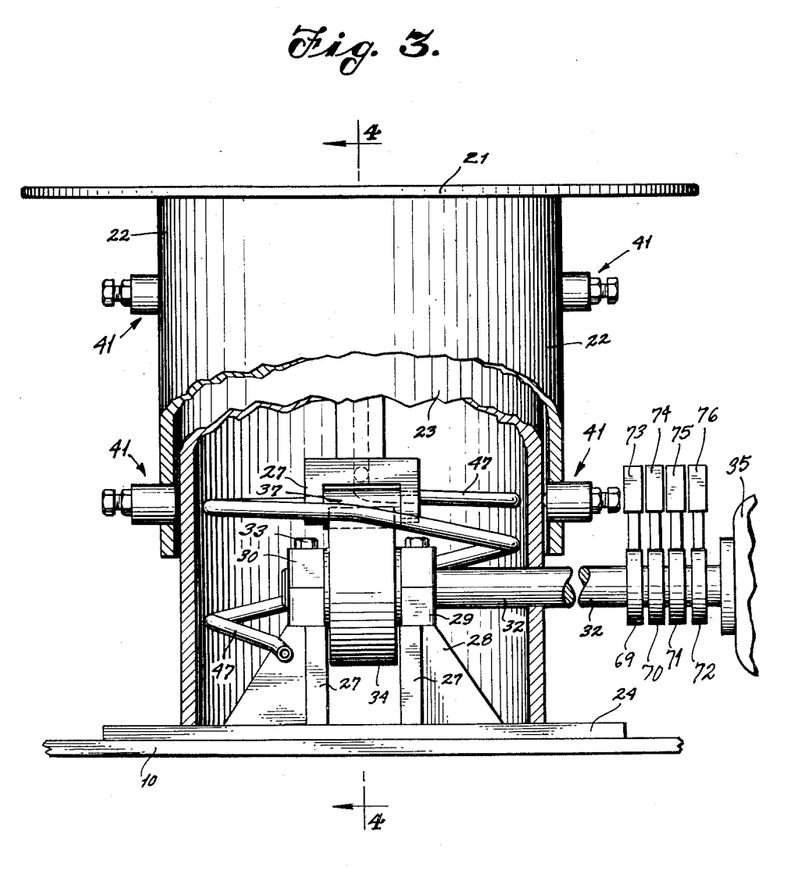
Fig. 3 is an elevational view, with parts broken away and with parts in section, on a larger scale, and showing the jolting or vibrating packing means and some of the associated parts.
Figure 4:
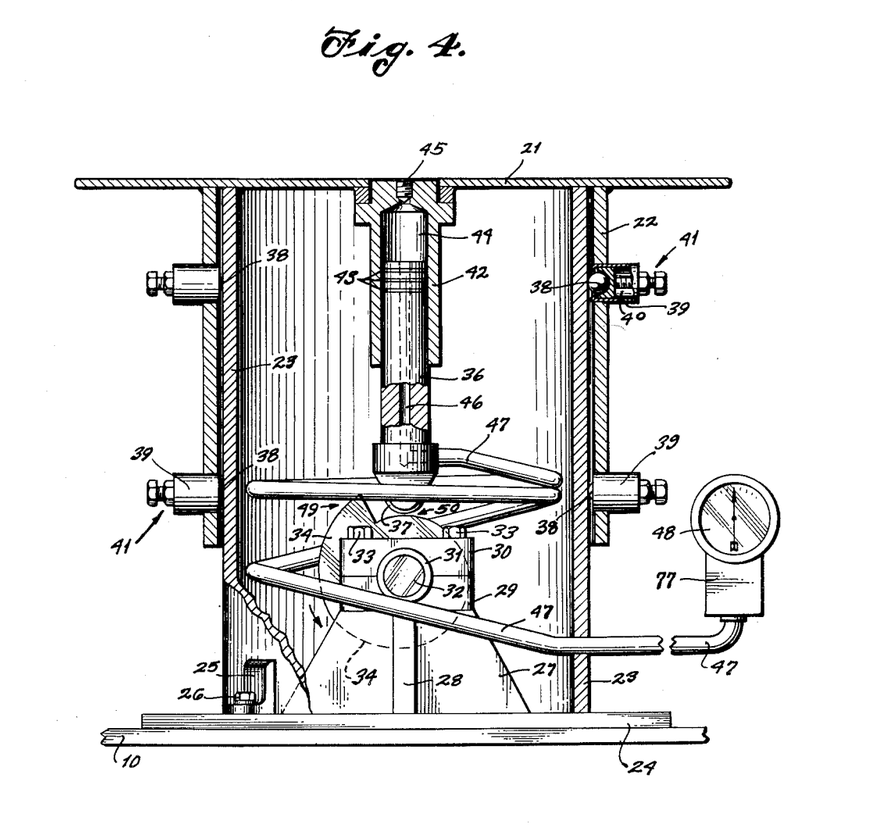
Fig. 4 is a sectional view, with parts in elevation, of the construction shown in Fig. 3, taken substantially on broken line 4—4 of Fig. 3 and with the tubular conduit means shown in elevation.

The scale platform 21 is vertically reciprocable and details of an illustration thereof are best shown in the enlarged views, Figs. 3 and 4. Referring now to Figs. 3 and 4, a cylindrical tubular member 22 is rigidly secured to the scale platform 21 as by welding. The tubular member 22 slidably and telescopically interfits with a fixed tubular member 23. Any suitable guide means (not shown) is provided to prevent relative angular movement between tubular members 22 and 23. The fixed tubular member 23 is carried by and secured to a base or supporting means, such as a circular plate 24 which circular plate 24 is secured to the base 10 as by welding. One form of securing tubular member 23 to the plate 24 is by a plurality of ears or lugs 25 which are welded to the external surface of tubular member 23 and which are, in turn, secured to the plate 24 by cap screws 26. A cam supporting base may comprise a plurality of vertical plates 27 and 28 welded together and also welded to a horizontal bearing plate 29. Horizontal bearing plate 29 and removable bearing plate 30, support a bearing 31, which bearing 31 supports the shaft 32. The bearing plates 29 and 30 are detachably connected together as by cap screws 33.

The shaft 32, which is rotatively supported by bearing 31, rigidly carries cam 34 and is connected with the rotor of a prime mover, as electric motor 35. A piston 36 is provided with anti-friction means to follow the cam surface of cam 34 which may be accomplished by roller 37 secured to said piston 36.

The purpose of cam 34 is to cause piston 36 and parts connected therewith, as scale platform 21 and tubular member 22, to reciprocate. Thus the tubular members 22 and 23 must be mounted for relative sliding vertical movement. Preferably anti-friction means are thus provided between the members 22 and 23 which may be in the nature of a plurality of balls 38 disposed between the tubular members 22 and 23 and distributed about the peripheral surface of the outside of tubular member 23. Adjusting means for each ball 38 comprises housing 39 slidably supporting a ball retainer 40 which is moved toward or away from the tubular member 23 by cap screw and locking nut means 41. By adjustment of the various cap screw and locking nut means 41, the tubular members 22 and 23 can be spaced from each other and mounted for movement through anti-friction bearings including the balls 38—obviously roller bearings may be substituted for the ball bearings 38.

A suitable weighing mechanism involved in my invention includes trapped liquid in reservoir 44. However, my invention is not limited to a hydraulic weighing means or the illustrated weighing mechanism utilizing the same except as required by the appended claims. The piston 36 mates with its cylinder 42 and suitable sealing piston rings 43 are provided. Piston 36 is held against rotary movement by any suitable guide means (not shown). A liquid reservoir 44 is provided with a removable fill cap 45. Any liquid in the reservoir 44 may pass through conduit 46 which is in the nature of a drilled passageway in the piston 36. Conduit 46 is in communication with a conduit 47, which conduit 47 preferably has a helical portion as indicated. Conduit 47 communicates with a pressure responsive instrument 48 and instruments located in the box 77 which will be described in connection with Fig. 8.

As the shaft 32 is rotated by motor 35, the cam 34, which is driven thereby, will cause the piston 36 to reciprocate which, through liquid in chamber 44, will reciprocate the cylinder 42, scale platform 21, and any load carried thereby, such as bin 19. The pressure on the trapped liquid in the reservoir 44 will be reflected on the trapped liquid in conduits 46 and 47. Objects resting on the scale platform 21 are to be weighed but the trapped liquid should not be jolted or jarred as reactions inconsistent with the actual weight will obtain in the pressure instrument 48 and in other pressure responsive means in box 77. However, when the portion 49 of the cam 34 passes the roller 37, the scale platform 21 and the load are permitted to drop but, at this stage of the cycle (which is illustrated in Fig. 4 of the drawings), the cam portion 50 is presented below the roller 37 and the scale platform 21 is supported by the fixed tubular member 23. Thus, during all upward movement of the load, a true reading which is commensurate with the actual weight of the scale platform 21, and parts carried and supported thereby, obtains in the pressure instrument 48. However, when the cam portion 49 passes roller 37, the scale platform 21 and parts carried by or supported thereby, will suddenly fall and the bin 19 will be violently jarred but this reaction will not be reflected in the amount of fluid pressure in conduits 46 and 47. Also, as described in connection with Fig. 8, a valve 78 is preferably provided to disconnect the pressure responsive means in box 77 from conduit 47 when platform 21 is allowed to drop.

The bin 19 illustrates a type of container to be jarred or jolted to pack granular material therein. The bin 19 has a fill opening 52 (Fig. 5) and the driven spinner or impeller 53 is movable into or out of the fill opening 52 as will be hereinafter explained.

Figure 5:
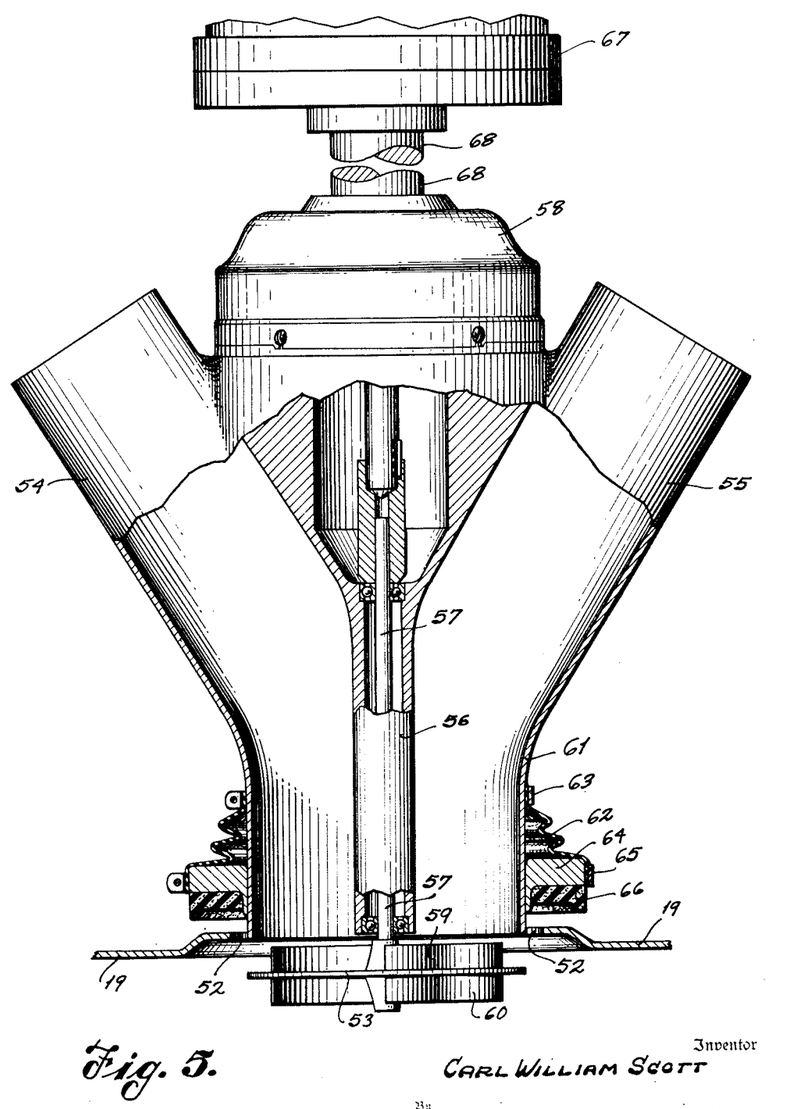
Fig. 5 is a view partly in elevation and partly in section and with parts broken away, showing details of the filling mechanism.

The filling device comprises a material inlet conduit 54 and an air discharge conduit 55 (Figs. 1 and 5). The conduits 54 and 55 are preferably separated from each other by a baffle plate 56. The baffle plate 56 may be in the nature of a wall which separates the conduits 54 and 55, and at the same time has a central tubular portion which functions as a housing for a driven shaft 57. The baffle plate 56 is provided with suitable bearings to mount the driven shaft 57 therein. A prime mover such as electric motor 58 drives shaft 57. The spinner or impeller 53 comprises a disc with vanes 59 and 60 respectively on the top and bottom surfaces thereof. The vanes 59 and 60 preferably spiral outwardly from the center toward the periphery of the disc.

The vanes 59 and 60 cause granular material passing downwardly from conduit 54 to change its direction to substantially a horizontal direction and thus move laterally in the bin 19 and then the granular material will fall by gravity down into the bin. The bin 19 is thus filled with material which is forced laterally after the same leaves the spinner or impeller 53. As the material fills up in the bin, material will not tend to pack below the spinner or impeller 53 because of the vanes 60.

The conduits 54 and 55 converge to form a single tubular conduit or impeller housing 61. Impeller housing 61 supports a bellows 62, which bellows 62 is formed of pliable and flexible material such as heavy duck canvas. The bellows 62 may be detachably connected with the impeller housing 61 by a clamp 63. An annular weight 64 is movable vertically relative to the impeller housing 61 and is detachably connected to the bellows 62 as by clamp 65. Preferably a cushion member, as an annular rubber ring 66 is secured to the weight 64 and functions as a cushion between the weight 64 and the fill opening 52.

The complete assembly, comprising parts 53 to 66 inclusive, may be raised or lowered by any suitable mechanism and as an illustration thereof, I have indicated an air cylinder 67 having a reciprocable piston and rod means 68 therein. As any suitable means can be employed for raising or lowering the said assembly, the details concerning the air cylinder and parts therein are only schematically illustrated. As the said assembly is lowered, the rubber ring 66 rests on the fill opening 52 and as the bellows 62 is collapsed, the spinner or impeller 53 may be moved into the bin 19 and impeller housing 61 will pass into the fill opening 52, but will not engage the same. In Fig. 5 of the drawings the impeller 53 is shown in its lowermost position, but the ring 66 and parts connected therewith are not, as it is believed that such a view better illustrates the structure involved. During filling, we will thus have a fixed weight on the bin 19 which will comprise the weight 64, the rubber ring 66 and a portion of the weight of the bellows 62. The bellows 62 can be elongated or collapsed sufficiently so that the impeller housing 61 will be maintained in the fill opening 52 even though the bin 19 is being raised and lowered by the cam 34. During filling, air will be exhausted from the granular material due to the jolting action caused by cam 34 and the material will be compacted and the bin filled to a substantially uniform level.

The filling mechanism, the jolting mechanism, and the weighing mechanism are interconnected so that the device will automatically go through a complete cycle, after the cycle is once started. The cycle of operation generally may be described as first lowering the impeller housing 61 into the fill opening 52. Preferably, the cycle is interrupted at this point to permit inspection and to determine that the impeller housing 61 is centered in the fill opening 52 and that the only portion of the fill mechanism which will be carried by the bin 19 will be the weight 64, rubber ring 66, clamp 65, and a portion of the weight of the bellows 62. Then the operator starts the spinner or impeller 53. Next the cam 34 starts which causes periodic jolting of the bin 19. Then when a predetermined weight is reached, such as 2950 pounds, the spinner or impeller 53 operates periodically rather than continuously to dribble in or to finish the weighing with restricted flow of material. A way of providing a dribble stream or restricted inflow of material is to cause the spinner or impeller 53 to move slightly each time the portion 49 of the cam 34 is supporting the roller 37 and parts supported thereby. When the final predetermined weight is nearly reached, such as 3,000 pounds, the cam 34 comes to rest and the spinner or impeller 53 no longer operates. Next, there is one final jolt so each weighing is under similar conditions to provide for accuracy of weight. Next, the impeller housing 61 and parts connected therewith are raised and the cycle is complete.

Figures 6, 7:
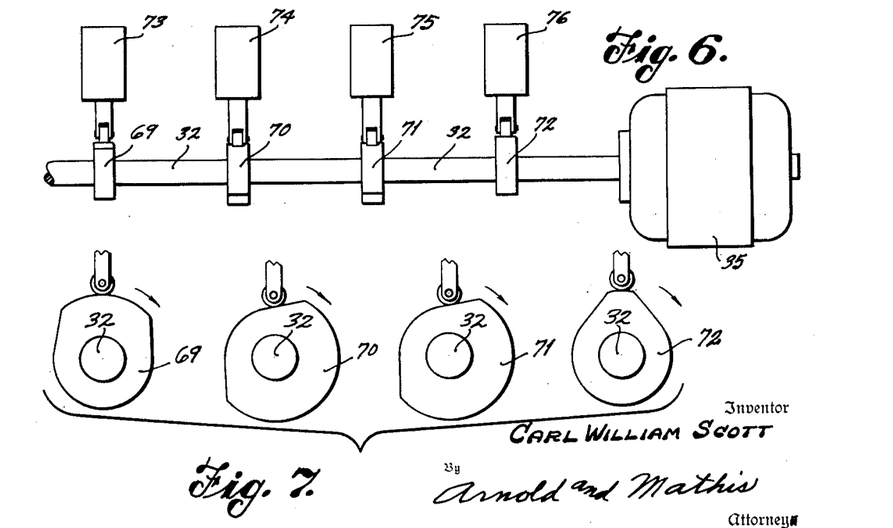
Fig. 6 is a schematic view in elevation of cams and associated electrical switches involved in the present invention.
Fig. 7 is a schematic or development view of the cams shown in Fig. 6, with each of the cams at right angles to the position shown in Fig. 6, and showing the relative positions of the cams at one period during a cycle of operation.

Referring now to Figs. 3, 6 and 7 of the drawings, the shaft 32 carries a plurality of cams 69, 70, 71 and 72 and switches 73 to 76 inclusive which are respectively operated by said cams 69 to 72 inclusive. The cams 69 to 72 inclusive are each shown detached and in the side elevation in Fig. 7 of the drawings to illustrate the relative cam timing positions. The positions shown are at the end of a cycle.

Figure 8:
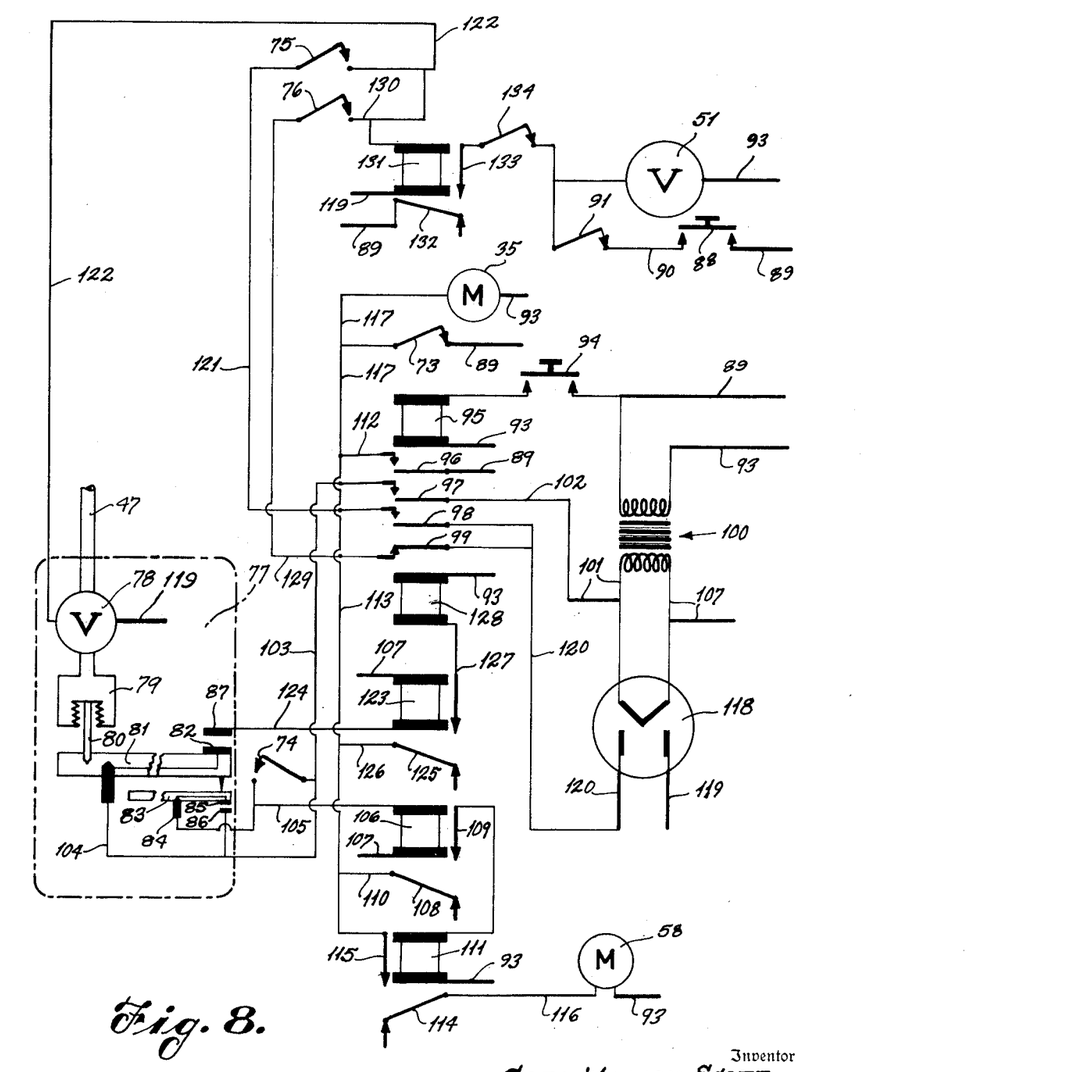
Fig. 8 is a schematic wiring diagram.

Referring now to the schematic wiring diagram of Fig. 8 and also to Fig. 4 of the drawings, the box 77 shown in Fig. 4 of the drawings and associated with the pressure instrument 48, has the parts enclosed therein diagrammatically illustrated in Fig. 8 of the drawings and the numeral 77 is applied to a boxlike structure in Fig. 4 and to a dot and dash line schematic showing in Fig. 8 to correlate the said two figures. Also, in said Fig. 8, the switches 73 to 76, which are operated by cams 69 to 72, are indicated. A valve 51 for operating air cylinder 67 shown in Figs. 1 and 5 is diagrammatically illustrated in Fig. 8 as well as the jolting motor 35 and the spinner motor 58.

Within the box 77 is a valve 78 and said valve 78 is open when the cam 34 is urging the roller 37 and parts connected therewith upwardly and said valve 78 is closed when the said cam 34 is not supporting the roller 37. Thus, when the pressure drops in the conduit 47, said valve 78 is closed and when the pressure in conduit 47 is proportional to the weight of the load supported by roller 37, then said valve is open. Thus, the pressure instrument 48 and the parts in box 77 which are responsive to pressure in conduit 47 and which are to be described will not continuously fluctuate. The cam and switch, which control the opening and closing of valve 78, are cam 71 and switch 75 as will appear from a description of Figs. 6, 7 and 8. When the valve 78 is open, pressure from conduit 47 is delivered to a mechanical bellows 79. This mechanical bellows 79 is a device for translating liquid pressure to mechanical motion and the mechanical motion obtaining is directly proportional to the liquid pressure. In the schematic showing, pressure on mechanical bellows 79 is translated to longitudinal movement of the rod 80. Rod 80 is connected with scale beam 81 which carries contact 82. An arm 83 is pivoted on fulcrum 84 and is weighted so that the arm 83 tends to turn in a counterclockwise direction. The arm 83 carries a contact 85 and the contact 85 is movable toward and away from a contact 86. The scale beam 81 is balanced so that the outer end thereof will normally rest on and hold one end of the arm 83 down with the contacts 85 and 86 electrically connected until a predetermined net weight, such as 2950 pounds, is reached. When this weight is reached, then there will be sufficient pressure by arm 83 to urge scale beam 81 to an intermediate position and electrical connection between contacts 85 and 86 is broken at such predetermined weight. When a final net weight is reached, such as one pound less than 3,000 pounds, then contact 82, carried by scale beam 81, moves into electrical connection with contact 87. The said one pound is a predetermined allowance for material which will be delivered to bin 19 after the closing of contacts 82 and 87.

Assuming that impeller housing 61 (see Figs. 1 and 5) and parts associated therewith are in an up position, then the cams 69 to 72 of Figs. 5 and 6 will be in the positions indicated and the switches 73 to 76 will be in open or closed position as will be described. In the wiring diagram (Fig. 8), all switches are shown in their normal position, i. e., if the switches are normally open switches, a gap is indicated whereas, if the switches are normally closed, the contact points of the switches will be indicated as closed. This—even though the switches may be open or closed at rest position because of the influence of cams 69 to 72.

In this position of the said parts, push button switch 88 may be manually closed and held closed. Then energy will flow from source 89 through then manually closed switch 88, along conductor 90, through limit switch 91, through valve 51, to the other source of energy 91. The valve 51 is of the type so that upon alternate energizing of the same, it alternately lowers the impeller housing 61 and raises said impeller housing 61. The limit switch 91 is positioned in the path of travel of the impeller housing 61, or parts connected therewith, so that limit switch 91 breaks the circuit just described as the impeller housing 61 reaches its lowermost position.

In the interests of clarity of drawings, the source of energy represented by conductors 89 and 93 is indicated by said reference numerals rather than by physically interconnecting such lead to a common source and thereby complicating the drawings.

After the impeller housing 61 is completely lowered and the circuit is broken by limit switch 91, then the operator can release push button switch 88 and permit it to travel to its normal open position. Switch 91 is a normally closed switch and moves to open position as the impeller housing 61 reaches its lowermost position. After the impeller housing 61 has reached its lower position, the operator can examine the relative positions of the various parts to insure that all devices are in a position to operate and to insure that the impeller housing 61 is free from the bin 19, and that the only weight supported by the bin 19 is a known weight, as the fixed weight 64 and a definite portion of the weight of the bellows 62. As long as a definite and fixed weight is involved, due compensation can be made therefor to provide for accurate weighing of the bin 19 and its contents.

After the operator has made due inspection and desires to have the filling and weighing operation completed, the operator momentarily closes manually operable normally open push button switch 94. Upon the closing of switch 94, energy from source 89 passes through then closed switch 94, through relay coil 95, and thence to the other source of energy 93. Upon energizing of relay coil 95, a plurality of switches 96, 97, 98 and 99 are operated. Switches 96, 97 and 98 are normally open while switch 99 is normally closed. Thus upon energizing of relay coil 95, switches 96, 97 and 98 move from open to closed position while switch 99 moves from closed to open position. Once relay coil 95 is energized, the switch parts are held mechanically in the positions just indicated and, if they are to move back to their normal position, this is accomplished by energizing of relay coil 128 as will later be explained. Thus, upon momentary closing of push button switch 94, it may be released and allowed to move back to its normal position. At this stage in the cycle, the scale beam 81 has its right end portion down, due to the lack of material in the bin 19, and contacts 85 and 86 are electrically connected. While the circuit involving contacts 85 and 86 could involve energy from source 89—93, it is preferable that a low voltage circuit involving a small current be employed which will increase the life of contacts 85 and 86. Thus a transformer 100 is disposed between electrical source 89—93. One wire 101 from the secondary of the transformer 100 is connected by conductor 102 with switch 97. As switch 97 is closed, energy from conductor 102 passes by conductor 103 to conductor 104, along arm 83, thence through closed contacts 85 and 86 to conductor 105. Energy on conductor 105 passes through coil 106 of a relay and thence to the other source 107 of energy from the secondary of transformer 100. Again, in the interest of clarity of drawings, all of the various taps from conductors 101 and 107, representing secondary energy from the transformer 100, are not shown interconnected but in each instance they are given the same numbers. Upon the energizing of relay coil 106, switch 108 moves from its normally open position to closed position between conductors 109 and 110.

As switch 96 is closed at this stage, energy commences from source 89 through closed switch 96 to conductor 112. Energy from conductor 112 passes via conductor 113 to conductor 110, through then closed switch 108 to conductor 109, through relay coil 111 to the other source of energy 93. Upon energizing of relay coil 111, normally open switch 114 is closed and conductors 115 and 116 are electrically connected upon the closing of switch 114. Thus, upon the closing of switch 114, energy on conductor 113 from one source 89 is connected with conductor 115, thence via closed switch 114 to conductor 116, through and energizing impeller motor 58 and to the other source of energy 93. At the same time, energy from source 89 passes through then closed switch 96, along conductor 112, along conductor 117, through and energizing jolting motor 35, and to the other source of energy 93. The two relays 106 and 111 are employed in the circuit just described as this permits employing a rather sensitive relay 106 and a power relay 111.

As motor 35 starts to rotate at this stage of the cycle, the shaft 32 will start to rotate and likewise the cams 69 to 72 on said shaft 32 will start to rotate. Until contact is broken between contacts 85 and 86 and this because of a first predetermined weight, motors 58 and 35 will continue to operate. Also the cam 71 and its associated electrical switch 75 will open and close the valve 78, and this for the purpose of closing valve 78 when the cam 34 is not supporting the load on scale platform 21 and to open the valve 78 when the cam 34 is supporting the load on the platform scale. More specifically, valve 78 is closed shortly before the bin 19 is jolted and opened shortly after the cam 34 supports the load so as to isolate any jar from the weighing mechanism.

The valve 78 is electrically operated, and I have indicated that a direct current operated valve may be employed. It is to be understood that this is merely an illustration and not a limitation. Referring to transformer 100, the secondary of the same may be connected to a rectifier as tube 118. Thus conductors 119 and 120 will illustrate a source of energy, such as six volts direct current. Energy passes from conductor 120, through then closed switch 98, along conductor 121, through normally open switch 75. Switch 75 is closed periodically and at the intervals controlled by cam 71. Energy passing through switch 75 passes along conductor 122, through electrically controlled valve 78, and thence to the other source of electrical energy 119.

When the first predetermined weight is reached, such as 2950 pounds, electrical connection between contacts 85 and 86 is broken as the end of arm 83 carrying 85 raises because of the pressure in conduit 47 and the movement of rod 80 and beam 81. Relay coil 106 was fed through a circuit including said contacts 85 and 86 and thus said relay coil 106 will be de-energized when electrical contact between contacts 85 and 86 is broken. Also, relay 111 was fed through a circuit which involved switch 108 and said switch 108 moves to open position upon de-energizing of coil 106 and hence switch 114 moves to open position and impeller motor 58 becomes de-energized. However, another circuit to impeller motor 58 may be established through switch 74. Cam 70, carried by shaft 32 (see also Figs. 6 and 7), will operate switch 74 periodically during a portion of each revolution of the shaft 32. Switch 74 is disposed between conductors 104 and 105. Thus, even though the circuit was broken between conductors 104 and 105 by the breaking of contact between contacts 85 and 86, the circuit between conductors 104 and 105 will be periodically made as the switch 74 is periodically closed. Thus, briefly the circuit which is periodically closed by switch 74 will involve: source 101, conductor 102, switch 97, conductor 103, switch 74, conductor 105, relay coil 106, and source 107. While switch 74 was periodically closed when contacts 85 and 86 were interconnected, this merely paralleled the circuit closed by reason of interconnection between contacts 85 and 86 and thus the periodic opening and closing of switch 74 had no effect on the circuit, at that time.

As soon as a final predetermined weight is reached, such as 3000 pounds (less a definite allowance as previously mentioned), then electrical connection is established between contacts 82 and 87. This will energize relay coil 123. The circuit involved may be traced as follows: source of energy 107, through relay coil 123, along conductor 124, through contacts 87 and 82, along the scale beam 81 to conductor 104, along conductor 103, through switch 97, along conductor 102 to the other source of energy conductor 101. Energizing of relay coil 123 closes switch 125 between conductors 126 and 127. Closing of switch 125 establishes a circuit commencing with conductor 93, through relay coil 128, along conductor 127, through switch 125, along conductor 126, along conductor 113, along conductor 112, through switch 96 to the other source of energy 89, thus energizing relay 128. The relay switch, comprising coil 95, switches 96 to 99, and coil 128, is a mechanical locking relay. In other words, upon energizing of coil 95, switches 96 to 98 move to their closed positions and switch 99 moves to open position. The switches are mechanically locked in this position and the mechanical lock is released upon energizing of coil 128, and thereupon said switches are moved to their normal positions. The switch 73 is a normally closed switch and is operated by the cam 69 on the shaft 32. Even though switch 96 feeding motor 35 is opened, by energizing of relay 128, energy will pass from source 89 through periodically closed switch 73, along conductor 117, through motor 35 and thence to the other source of energy 93. As the cam portion of cam 69 moves to open switch 73, motor 35 is de-energized. The timing relation of the cam 69 is such so that there will be one final jolting after de-energizing of coil 128 and the shaft 32 will always stop in the same place permitting the said final jolt. This provides for more accurate weighing in that each cycle is completed under the same circumstances. Shaft 32 of motor 35 and shaft 57 of motor 58 should be electrically or mechanically braked (not shown) so that, upon de-energizing of each of the said motors, there will not be over travel except that controlled by cam 69 and switch 73 of Figs. 6, 7 and 8.

Switch 99 is a normally closed switch and thus the following circuit will be established at this portion of the cycle: commencing with source 120, through switch 99, along conductor 129, through switch 76, along conductor 130, along conductor 122, through electrically controlled valve 78 and to the other source of energy 119. It will be recalled that electrically controlled valve 78 was energized only when the cam 34 was supporting the weight on scale platform 21. Thus with the final jolt and with the cam 34 not supporting the weight, the valve 78 will be closed and with the full pressure thereon. In order to bleed this line and open the valve 78, the circuit was thus established through switch 99. Also, the switch 76 will be closed at this stage of the cycle because of the cam 72.

It is also desired at this stage of the cycle to lift the impeller housing 61 and parts connected therewith or to remove the loading mechanism from out of the bin opening 52. Energy on conductor 130, as just described, will also pass through relay coil 131, to the other source of energy 119, thus energizing said relay coil 131. Energizing of relay coil 131 closes the switch 132 establishing the following circuit: source 89, through switch 132, along conductor 133, through normally closed limit switch 134, through valve 51, and to the other source of energy 93. The valve 51 is of the type so that upon alternate energizing of the same it alternately operates air cylinder 67 so that alternately the impeller housing 61 and parts associated therewith are raised or lowered depending on the starting position. In other words, if the impeller housing 61 and parts connected therewith are in their upper position, then if valve 51 is energized, the parts will be lowered and moved downwardly until interrupted by limit switch 91. Then if the parts are in a lower position and if the circuit is established through switch 132, then the air cylinder 67 will move the impeller housing 61 to the up position until the circuit is interrupted by the opening of limit switch 134. Limit switch 134 is suitably positioned so that it will be opened when the impeller housing 61 and parts connected therewith reach a desired upper limit.

At this point, a cycle has been completed and another cycle may be started by closing manual push button switch 88 to lower the impeller housing 61 and parts connected therewith, and next, by closing manual push button switch 94 to cause the apparatus to continue and complete another cycle.

Obviously, the particular electrical apparatus illustrated is an illustration of means to electrically interconnect the parts involved and the particular electrical apparatus should not be considered as a limitation of my invention.

From the foregoing description, it is obvious that I have provided a filling and weighing device for a bin, and in this respect the word "filling" is broad enough to include the material inlet conduit 54 of Fig. 5 or the packing action which obtains by the jolting mechanism including cam 34 for the distribution of the material during filling accomplished by the impeller 53. The means for reciprocating the bin supporting scale platform 21 comprises (Figs. 3 and 4) the driven shaft 32 having cam 34 mounted thereon. The piston 36 having cam engaging roller 37 on the bottom thereof is interconnected with the cylinder 42 by means of trapped liquid in the chamber 44, conduit 47 and parts associated with said conduit. The conduit 47 is shown in the form of a helix which is merely illustrative of a flexible connection between the conduit 47 containing liquid under pressure and the pressure responsive means, which will include the valve 78 and bellows 79 (see Fig. 8).

As the reciprocating means for the supporting scale platform 21, which may be in the nature of the cam 34, angularly moves, the cam portion 49 may pass the roller 37 permitting the scale platform to drop until the legs 18 of the bin 19 are supported by the fixed support comprising plates 14. The weight responsive means or hydraulic responsive means will include the valve 78 and bellows 79 of Fig. 8, and the switch means operable thereby will include the switch contacts 85—86 and 87—82. The said switch means are in a circuit controlling the operation of the filling device, which is best shown above a fragment of the bin in Fig. 1 of the drawings. While I have shown weight responsive means in the nature of devices including hydraulic means therein, it is to be understood that my invention is not limited to such a construction. The weight responsive means should be isolated from the scale platform 21 whenever the scale platform 21 is being jolted. Thus, if weight responsive means of the type illustrated are employed, then a valve member 78 should be provided which can be periodically opened and closed and which will be in open position when the cam 34 is supporting the load and will be in closed position when the cam is not supporting the load and the load is being jolted.

As one type of bin filling means which may be controlled by the weight on the platform scale 21 and by the angular position of the shaft 32 through the various cams 69, 70, 71 and 72, I have shown the impeller 53 best shown in Fig. 5 of the drawings. This impeller 53 includes a disc or plate having mounted thereon the vanes 59 and 60 which are in the nature of ribs which extend from the center of the disc toward the periphery of the disc. In the drawings and descriptions, these vanes are indicated as vanes which spiral outwardly from the center of the disc toward the periphery thereof and in plan will be a fragment of a helix. The top vanes 59 have the function of changing the directional flow of granular material and moving the same horizontally and thus substantially removing any vertical component. It is also important to note that as the impeller housing 61 is lifted, the weighted ring remains relatively stationary, within limits determined by its bellows 62, and bellows thus relatively moves downwardly over impeller 53 and thus functions as a valve.

In the illustrated and described embodiment of my invention, the filler mechanism is first lowered in place by closing switch 88. After the filling mechanism is lowered into place, then the cycle is interrupted so that an operator can positively determine that all parts are in the desired operative positions. Then the operator can close switch 94 and the operation thereafter will be automatic, and after final weighing, the filling mechanism will move back to its normal and raised position and thus complete a cycle of operation so that the mechanism is ready to fill and weigh another bin.

Preferably, the filling mechanism not only includes the infeed housing 54 and the impeller 53 but also includes an air exhaust 55 so that as air is jolted out of the product during filling and packing, the air being displaced and that jolted out are removed by the housing 55. Preferably, a bag, much like that used in ordinary household vacuum cleaners, is provided about the housing 55, and as the use of bags to filter air from material is old in the art, such bag has not been illustrated or claimed.

In the interest of economy of construction, the conduits 54 and 55 are joined together to form a common impeller housing 61 having a partition wall therebetween, and which partition wall also functions to mount impeller motor 58 and driven shaft 57.

To permit allowance for a given weight, the housing 61 does not contact nor is it supported by the bin 19. The housing 61 is suspendedly supported by the piston 68 which is reciprocable in the air cylinder 67. Obviously, other forms and arrangements may be employed to raise or lower the impeller housing 61, and it is to be understood that the air cylinder 67 and associated parts are merely illustrative. By the bellows 62 and the fixed weight 64, a product tight connection is made between the impeller housing 61 and the top of the bin 19, and at the same time there is a fixed weight involved so that allowance may be made therefor in determining the net weight of the material in the bin 19. In view of the fact that the cams 69 to 72 inclusive are carried by the driven shaft 32, the associated switches 73 to 76 inclusive will have their operative positions directly influenced by the relative angular position of the shaft 32. As these various electrical switches are in the circuit controlling the filling mechanism, the filling mechanism is not only influenced by the weight involved but the relative angular position of the driven shaft 32.

Obviously, changes may be made in the forms, dimensions, and arrangements of the parts of my invention without departing from the principle thereof, the above setting forth only preferred forms of embodiment of my invention.

I claim:

1. A granular material weighing device for a bin, comprising a fixed support for said bin; a reciprocable bin supporting scale platform movable upwardly to lift said bin and movable downwardly to drop the same on said fixed support; scale platform moving means comprising a driven shaft with cam means thereon; electric switch means operatively connected with said cam means; hydraulic responsive means; hydraulic means interconnecting said scale platform moving means and said hydraulic responsive means; an electrically controlled valve member disposed in said hydraulic means to open and close the liquid connection between said scale platform moving means and said hydraulic responsive means; and electric circuit for said electrically controlled valve including therein said electric switch means and including relay means, whereby the operative position of said valve depends upon the angular position of said driven shaft of the scale platform moving means.

2. A filling and weighing device for a bin comprising a fixed support; a reciprocable bin supporting scale platform for supporting said bin, movable upwardly to lift said bin, and movable downwardly to drop on said fixed support; scale platform moving means; weight responsive means; and weight responsive operating means connecting the weight responsive means with the scale platform when said scale platform is carried by said scale platform moving means, and disconnecting the weight responsive means from said scale platform when said platform is not supported by the scale platform moving means.

3. A filling and weighing device for a bin comprising a fixed support; a reciprocable bin supporting scale platform for supporting said bin, movable upwardly to lift said bin, and movable downwardly to drop on said fixed support; scale platform moving means; weight responsive means; weight responsive operating means connecting the weight responsive means with the scale platform when said scale platform is carried by said scale platform moving means, and disconnecting the weight responsive means from said scale platform when said platform is not supported by the scale platform moving means; bin filling means; and control means for said bin filling means responsive to said weight responsive means.

4. A filling and weighing device for a bin, comprising a fixed support; a reciprocable bin supporting scale platform for supporting said bin, movable upwardly to lift said bin and movable downwardly to drop on said fixed support; weight responsive means connected with said scale platform; scale platform moving means; electric switch means operatively disposed as respects said scale platform moving means; electric switch means controlled by said weight responsive means; electricaly controlled bin filling means; and electric circuit means interconnecting said switches and including relay means, whereby said bin filling means is responsive to said weight responsive means and also responsive to the position of said scale platform moving means.

5. A filling and weighing device for a bin comprising a fixed support; a reciprocable bin supporting scale platform for supporting said bin, movable upwardly to lift said bin, and movable downwardly to drop on said fixed support; scale platform moving means; weight responsive means; a filling housing suspendedly supported above said bin; a flexible bellows-like hose member having the upper end portion thereof connected with said housing; and a weight member of predetermined weight, having an opening therethrough, suspendedly supported by the lower end portion of said hose member, which weight member may be caused to rest on said bin and surround said fill opening whereby during weighing the weight of said predetermined weight and a predetermined portion of the weight of said hose member will be reflected in the total weight on the scale platform.

6. A filling and weighing device for a bin, comprising a fixed support; a reciprocable bin supporting scale platform for supporting said bin, movable upwardly to lift said bin and movable downwardly to drop on said fixed support; weight responsive means connected with said scale platform; scale platform moving means comprising a driven shaft carrying cam means thereon; electric switch means operatively disposed as respects said cam means; electric switch means controlled by said weight responsive means; electrically controlled bin filling means; and electric circuit means interconnecting said switches and including relay means, whereby said bin filling means is responsive to said weight responsive means and also responsive to the angular position of said driven shaft.

7. A filling and weighing device for a bin, comprising a fixed support; a reciprocable bin supporting scale platform for supporting said bin movable upwardly to lift said bin and movable downwardly to drop on said fixed support; scale platform moving means; electric switch means operatively connected with said scale platform moving means; hydraulic responsive means; hydraulic means interconnecting said scale platform moving means and said hydraulic responsive means; electrically controlled valve member disposed in said hydraulic means to open and close liquid connection between the said scale platform moving means and the said hydraulic responsive means; and electric circuit means for said electrically controlled valve including therein said electric switch means and including relay means, whereby the operative position of said valve depends upon the position of said scale platform moving means.

CARL WILLIAM SCOTT.

REFERENCES CITED

The following references are of record in the file of this patent:

UNITED STATES PATENTS

| Number | Name | Date |
| --- | --- | --- |
| 1,437,260 | Morris | Nov. 28, 1922 |
| 1,528,976 | Guelbaum | Mar. 10, 1925 |
| 1,598,128 | Gase | Aug. 31, 1926 |
| 1,814,171 | Marsh | July 14, 1931 |
| 1,957,874 | Wright | May 8, 1934 |
| 2,089,526 | Andreas | Aug. 10, 1937 |
| 2,310,689 | Gibson | Feb. 9, 1943 |
| 2,339,152 | Connelly et al. | Jan. 11, 1944 |
| 2,373,469 | Grime | Apr. 10, 1945 |